June 30, 1931.  W. ZECHLAU  1,812,391

PISTON FOR INTERNAL COMBUSTION ENGINES

Filed Sept. 30, 1929

Inventor:
Walter Zechlau,

Att'y.

Patented June 30, 1931

1,812,391

UNITED STATES PATENT OFFICE

WALTER ZECHLAU, OF BERLIN, GERMANY

PISTON FOR INTERNAL COMBUSTION ENGINES

Application filed September 30, 1929, Serial No. 396,264, and in Germany October 6, 1928.

The known manners of, and means for, fastening the head of the piston of an internal combustion engine to the body of the piston suffer from the drawback that the head is liable to become loose by reason of the expansion due to the action of the heat. The object of the present invention is to overcome said drawback and I attain that object by coupling the head and the body of the piston with one another by wedge-action exerted, preferably, by screw-threads, and by keeping the head in screwed-up, or tightened state by means of a spring or springs.

It is suited to the purpose to provide the piston head in known manner with ribs by means of which the heat is quickly and amply conducted away, but in view of the provision of the above-mentioned spring or springs the ribs must be arranged in such a manner that the spring is, or the springs are, prevented from becoming excessively hot and losing its, or their, elasticity by the action of the heat abstracted by said ribs.

Figure 1:
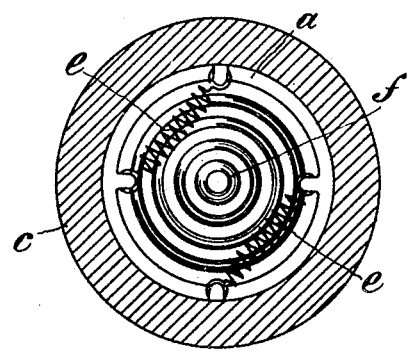
Figure 2:
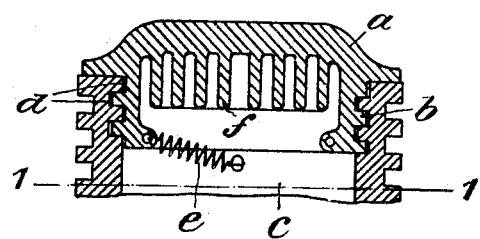
Figure 2:

The invention is illustrated diagrammatically and by way of example on the accompanying drawings on which Fig. 1 is a transverse section through a piston designed according to this invention, the section being taken in the line I—I of Fig. 2, and Figure 2 is an axial section through this piston.

The head and the body of the piston consists of different materials, that is to say, materials having different coefficients of expansion; the head may consist, for instance, of light metal and the body of iron. On the drawings, $a$ denotes the head which is screwed into the body $c$ with a flat thread $b$. In order to prevent, in the case of a considerable rise of temperature of the piston, the body $c$ from being burst by the stronger expanding head $a$ gaps $d$ are provided between the inner and the outer thread, as shown in Fig. 2.

The head $a$ is subjected to the action of at least one spring $e$, but I prefer to employ two such springs arranged opposite one another, as in Fig. 1. One end of each spring is affixed to the head, and the other to the body of the piston, and the arrangement of the springs is such that they constantly tend to draw the head tight on the body. The springs are so far remote from the ribs $f$ of the head $a$ that they cannot be detrimentally affected by the heat abstracted by said ribs.

I claim:

A motor piston, comprising, in combination, a piston head and a piston body connected with one another by screw-threads, the thread of the head and the thread of the body leaving gaps between them; and a tension spring having one end connected to said head and the other end connected to said body whereby when the said head becomes unscrewed in service the spring tends to return the head to normal position.

WALTER ZECHLAU.